United States Patent [19]

Katayama

[11] Patent Number: 4,866,317
[45] Date of Patent: Sep. 12, 1989

[54] SMALL ELECTRIC MOTOR

[75] Inventor: Koji Katayama, Himeji, Japan

[73] Assignee: Mitsubishi Denki Kabushiki Kaisha, Tokyo, Japan

[21] Appl. No.: 259,378

[22] Filed: Oct. 18, 1988

[30] Foreign Application Priority Data

Oct. 21, 1987 [JP] Japan ............................ 62-161103[U]

[51] Int. Cl.$^4$ ................................................ H02K 5/22
[52] U.S. Cl. ........................................ 310/89; 310/71; 310/40 MM
[58] Field of Search ...................... 310/40 MM, 71, 89

[56] References Cited

U.S. PATENT DOCUMENTS 2,801,354  7/1957  Donahoo ............................ 310/71
4,719,329  12/1988  Ubukata et al. ..................... 310/89

FOREIGN PATENT DOCUMENTS 0013646  1/1980  Japan ................................ 310/89
194658  11/1984  Japan .

Primary Examiner—Patrick R. Salce
Assistant Examiner—Judson H. Jones
Attorney, Agent, or Firm—Sughrue, Mion, Zinn, Macpeak and Seas

[57] ABSTRACT

A small electric motor has a housing which is secured to a cover. The cover has a longitudinally-extending guide member formed on one side thereof which partially surrounds the stator. A longitudinal groove which is formed in the guide member engages with a projection formed on the outside of the stator. An external connection terminal is secured to the cover and is electrically connected to the stator coil by a stator coil terminal which passes through an access hole formed in the guide member.

4 Claims, 2 Drawing Sheets

SMALL ELECTRIC MOTOR

BACKGROUND OF THE INVENTION

This invention relates to a small electric motor, and more particularly, it relates to a permanent magnet electric motor which is easy to assemble.

Conventional small-sized permanent magnetic electric motors have the drawback that they require a large number of electrical connections and that the motor must be assembled with the leads, which provide current to the stator, in a connected state. Therefore, assembly is difficult and time-consuming, poor electrical connections are often produced, and the leads may break during assembly, causing the motor to fail.

Furthermore, the stator leads are generally connected to a power supply through an external connection terminal which is separate from the motor. The cost of the leads running between the stator and the terminal and the need to provide a protective tube to protect the portions of the leads which is outside the motor increases the cost of the motor.

SUMMARY OF THE INVENTION

Accordingly, it is an object of the present invention to provide a small electric motor which can be easily assembled.

It is another object of the present invention to provide a small electric motor which is economical to manufacture.

It is yet another object of the present invention to provide a small electric motor which has a small number of electrical connections.

A small electric motor in accordance with the present invention is a permanent magnet motor which is enclosed in a housing equipped with a cover. The cover has a longitudinally-extending guide member formed thereon which partially surrounds the stator of the motor. The guide member has an engaging member in the form of a longitudinally-extending groove and an access hole formed therein, the access hole adjoining an external connection terminal which is secured to the cover. The stator has an engaging member in the form of a projection formed thereon which is inserted into the longitudinal groove of the guide member. When the projection is inserted into the longitudinal groove, a stator coil terminal which is connected to the stator coil is aligned with the access hole so that the stator coil terminal can be easily connected to the external connection terminal.

The guide member is preferably integrally formed with the cover. In one preferred embodiment, the guide member is in the form of a cylinder which substantially surrounds the stator with the exception of the access hole. In another preferred embodiment, the guide member is in the form of a plurality of separate projections which extend longitudinally from the cover.

BRIEF DESCRIPTION OF THE DRAWINGS

In the drawings, the same reference numerals indicate the same or corresponding parts.

DESCRIPTION OF THE PREFERRED EMBODIMENTS

Figure 1:
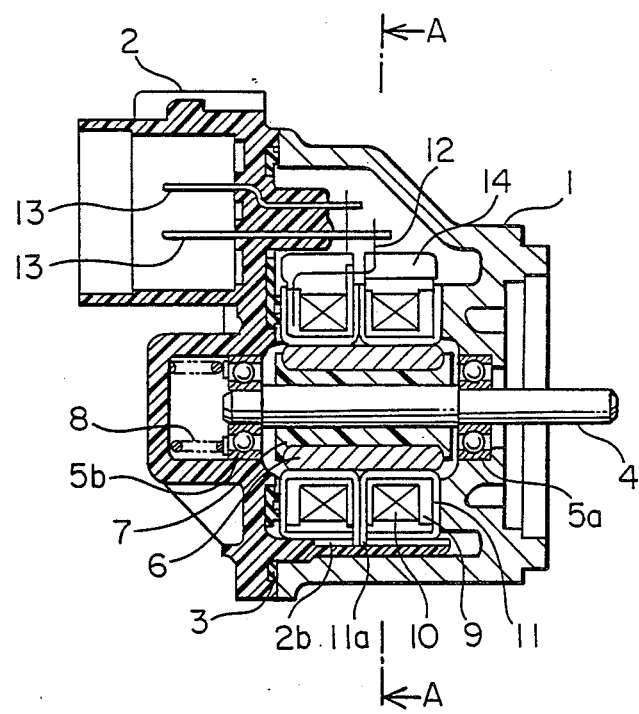
FIG. 1 is a longitudinal cross-sectional view of a first embodiment of the present invention.

Hereinbelow, a number of preferred embodiments of a small motor in accordance with the present invention will be described while referring to the accompanying drawings, FIGS. 1 and 2 of which illustrate a first embodiment. As shown in these figures, the motor has a cup-shaped housing 1 and a cover 2 which is secured to the rear rim of the housing 1. (In the following description, "rear" refers to the left side of FIG. 1, and "front" refers to the right side.) In this embodiment, the cover 2 is made of an electrically-insulating material, but other materials can instead be employed. A packing 3 is disposed between the confronting surfaces of the housing 1 and the cover 2. The cover 2 has a cavity at its center in which is disposed a ball bearing 5b which rotatably supports the rear end of a rotor shaft 4. The front end of the rotor shaft 4 extends to the outside of the housing 1, and the midportion thereof is rotatably supported by another ball bearing 5a which is secured to the inside of the housing 1. During the operation of the motor, the front end of the rotor shaft 4 is connected to an unillustrated load. A multi-pole magnet 6 is coaxially secured to the outside of the rotor shaft 4 by means of a plastic molding 7. In order to prevent play in the longitudinal direction of the rotor shaft 4, a compression spring 8 is disposed between the rear ball bearing 5b and the inside of the cavity of the cover 2.

The cover 2 has a cylindrical guide member 2a integrally formed on its front side. The guide member 2a extends parallel to and substantially surrounds the rotor shaft 4. The guide member 2a is for the purpose of supporting the stator of the motor and maintaining it coaxial with respect to the motor shaft 4. External connection terminals 13 are embedded in the upper portion of the cover 2 and extend between the front and rear sides of the cover 2. An access hole 2c is formed in the upper portion of the periphery of the guide member 2a adjacent to the external connection terminals 13. The access hole 2c enables easy access to the stator so that the external connection terminals 13 can be connected to the stator.

The stator has a bobbin 9, a stator coil 10 which is wrapped around the bobbin 9, and a stator core 11. The stator coil 10 is surrounded and protected by a plastic molding 14. Two stator coil terminals 12 are embedded in the molding 14. The inner ends thereof are connected to the ends of the stator coil 10, and the outer ends extend to the outside of the molding 14.

Figure 2:
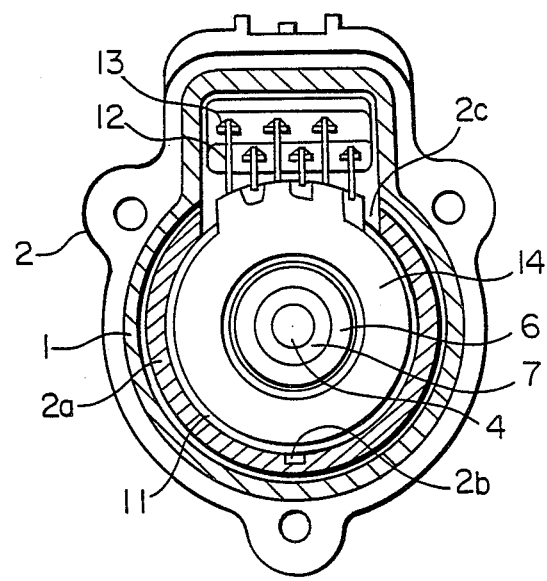
FIG. 2 is a transverse cross-sectional view taken along LIne A—A of FIG. 1.

As shown in FIG. 2, the guide member 2a has an engaging member in the form of a longitudinally-extending groove 2b formed in its inner surface, and the stator core 11 has a corresponding engaging member in the form of a projection 11a which is formed in its outer surface and is inserted into the groove 2b. The groove 2b is positioned so that when the projection 11a of the stator core 11 is inserted into the groove 2b, the stator coil terminals 12 are aligned with the access hole 2c. The front ends of the external connection terminals 13 are electrically connected to the stator coil terminals 12, and the rear ends thereof are connected to an unillustrated power supply.

The embodiment of FIGS. 1 and 2 is assembled as follows. The stator comprising the bobbin 9, the stator coil 10, the stator core 11, the stator coil terminals 12, and the molding 14 is first assembled. The packing 3 is inserted into the cover 2, and the stator is inserted into the guide member 2a atop the packing 3. When inserting the stator into the cover 2, the projection 11a of the stator core 11a is inserted into the groove 2b of the guide member 2a. The stator coil terminals 12, which extend through the access hole 2c, are soldered to the external connection terminals 13.

The spring 8 is then inserted into the cavity of the cover 2. The ball bearings 5a and 5b are fit over the opposite ends of the rotor shaft 4, and the rotor shaft 4 and the bearings 5a and 5b are then inserted into the hollow center of the stator. The housing 1 is then placed over the rotor shaft 4 and the stator and is secured to the cover 2 by unillustrated bolts.

Due to the provision of the guide member 2a, the stator can be easily and quickly inserted into the cover 2 and properly positioned. As a result, assembly time can be decreased. Because the external connection terminals 13 are integral with the cover 2 of the motor, long electrical leads are not necessary to connect these terminals 13 to the stator coil 10, so the cost of wiring is decreased. As the stator coil terminals 12 and the external connection terminals 13 are connected with one another after the insertion of the stator into the cover 2, good electrical connections are ensured and there is little likelihood of the terminals being damaged during assembly. In addition, the number of electrical connections which must be made during assembly is decreased. Therefore, an increase in reliability can be expected.

Figure 3:
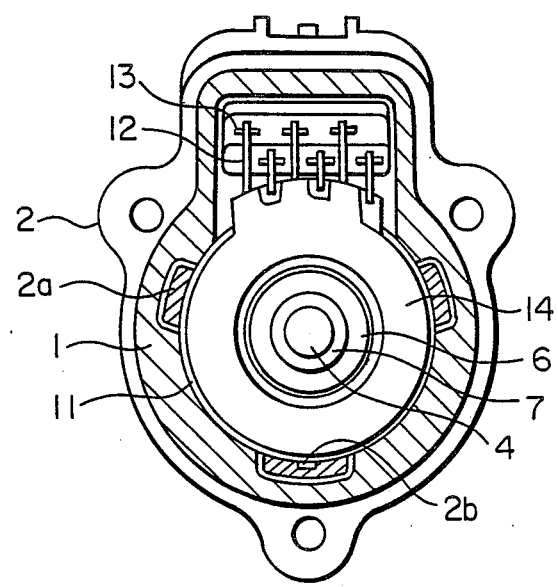
FIG. 3 is a transverse cross-sectional view of a second embodiment of the present invention.

FIG. 3 is a transverse cross-sectional view of another embodiment of the present invention. This embodiment differs from the previous embodiment in that instead of the guide member 2a being a cylinder, it is in the form of a plurality of projections which extend longitudinally from the front side of the cover 2 parallel to the rotor shaft 4 and are spaced apart from one another in the circumferential direction of the stator. One of the projections has a longitudinal groove 2b formed therein for guiding the stator core 11. This embodiment is assembled in the same manner as the preceding embodiment, and it provides the same benefits.

What is claimed is:

1. A small electric motor comprising:
   a rotor;
   a stator which surrounds said rotor and which has an engaging member formed thereon, said stator having a stator coil and a stator coil terminal which is connected to the ends of said stator coil and extends to the outside of said stator;
   a housing which surrounds said stator and journals one end of said rotor;
   a cover which is secured to said housing and journals the other end of said rotor, said cover having a longitudinally-extending guide member formed thereon which partially surrounds said stator, said guide member having an engaging member formed thereon which engages with the engaging member of said stator, said guide member having an access hole formed therein, said stator coil terminal being aligned with said access hole when said engaging member of said stator is engaged with said engaging member of said guide member; and
   an external connection terminal which is secured to said cover in the vicinity of said access hole, which extends through said cover between the inside and outside of said motor, and which is electrically connected to said stator coil terminal.

2. A small electric motor as claimed in claim 1, wherein said engaging member of said stator is an outwards projection which is formed on the outside of said stator, and said engaging member of said guide member is a longitudinally-extending groove which is formed on the inner surface of said guide member and which engages with said projection.

3. A small electric motor as claimed in claim 1, wherein said guide member is a cylinder which substantially surrounds said stator.

4. A small electric motor as claimed in claim 1, wherein said guide member comprises a plurality of projections which extend longitudinally from said cover and which are spaced apart from one another in the circumferential direction of said stator.

* * * * *